April 27, 1937. H. W. ALDEN 2,078,521
SUSPENSION FOR MULTIWHEELERS
Filed Feb. 15, 1934 3 Sheets-Sheet 2
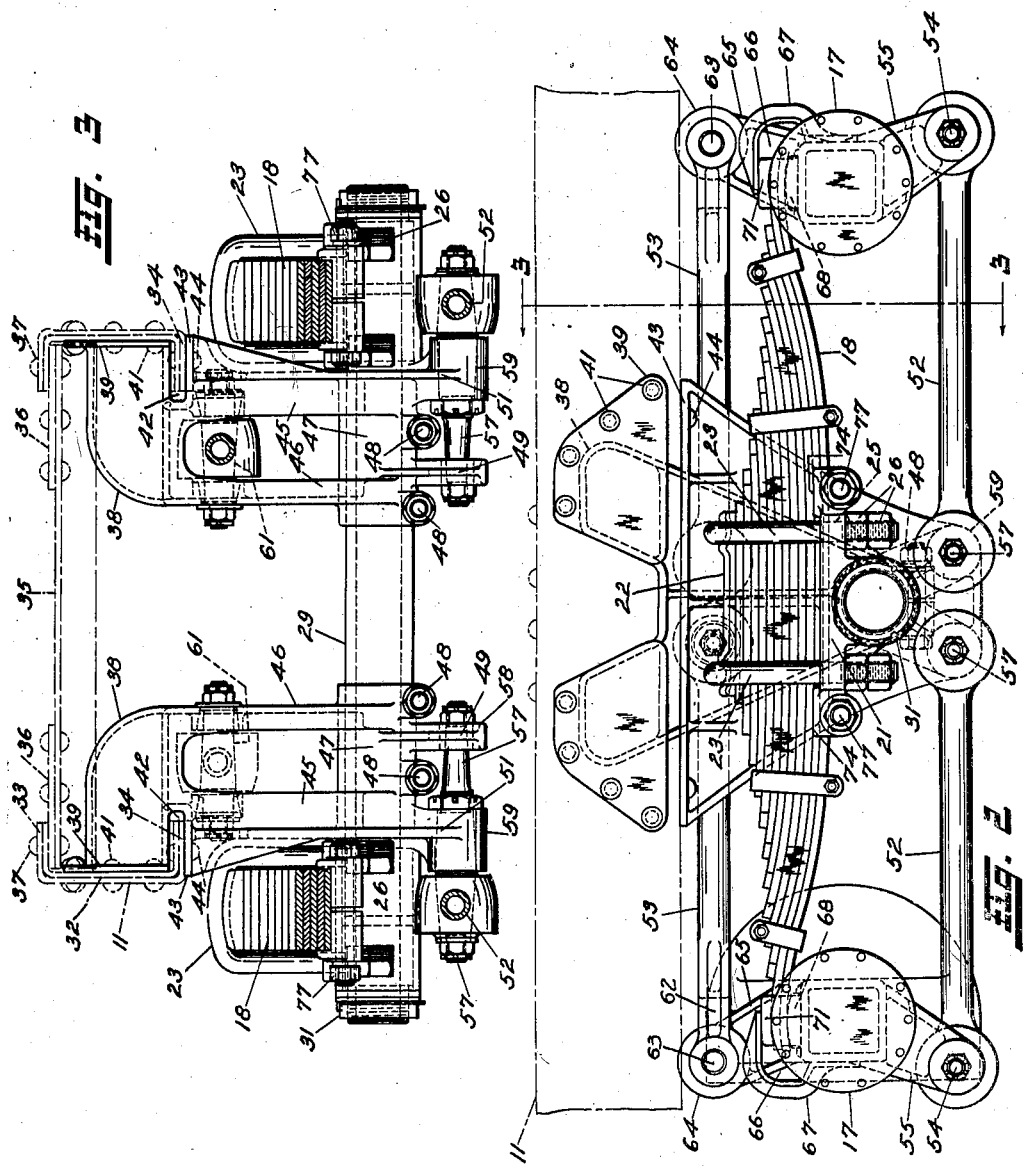
Inventor
HERBERT W. ALDEN
By Strauch + Hoffman
Attorneys April 27, 1937. H. W. ALDEN 2,078,521
SUSPENSION FOR MULTIWHEELERS
Filed Feb. 15, 1934 3 Sheets-Sheet 3
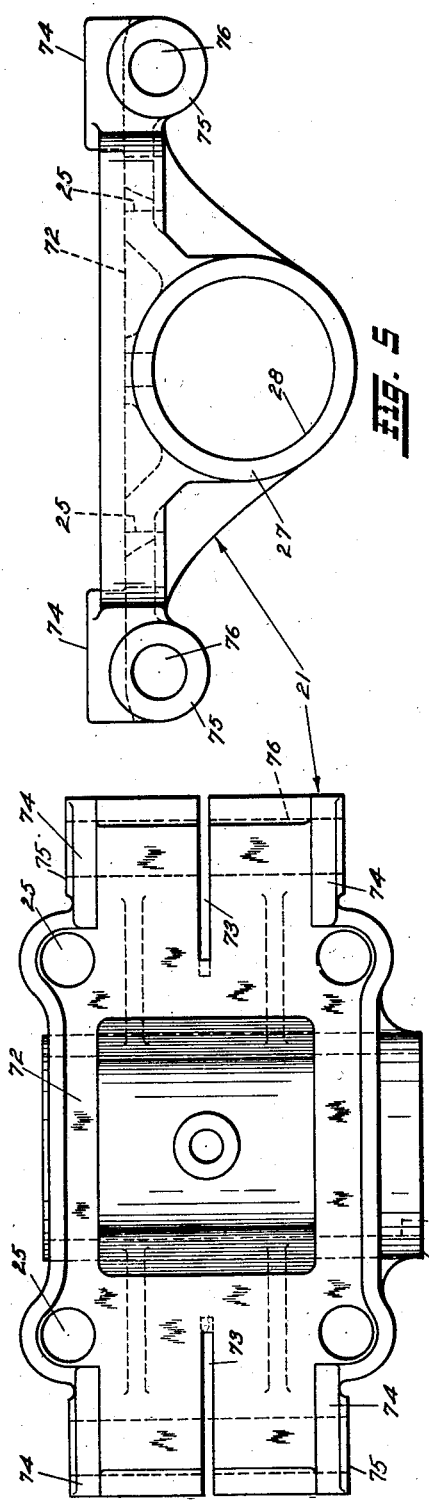
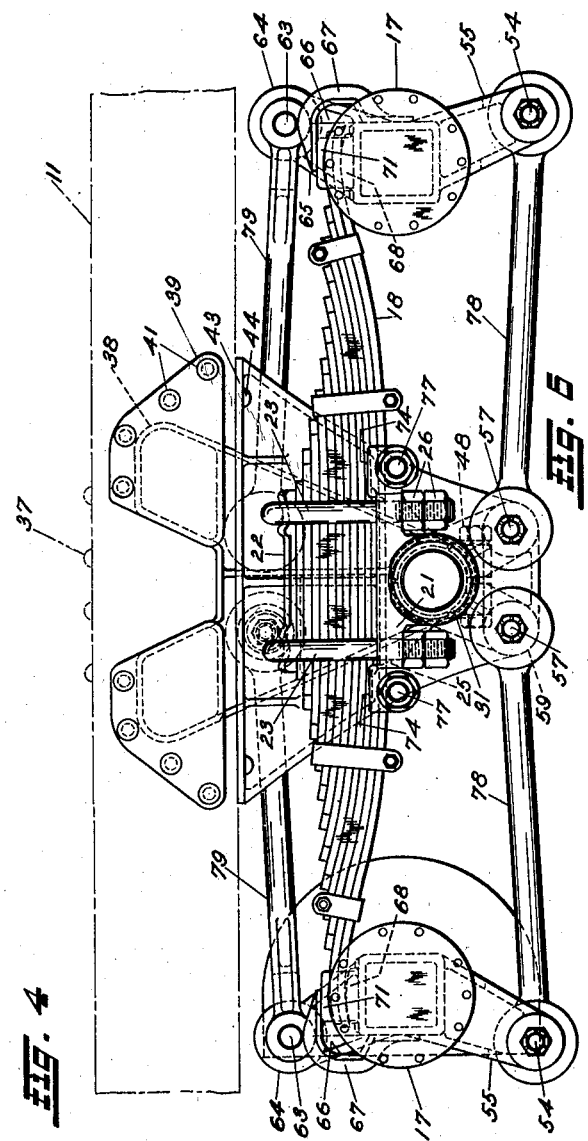
Inventor
HERBERT W. ALDEN
By Strauch + Hoffman
Attorneys Patented Apr. 27, 1937

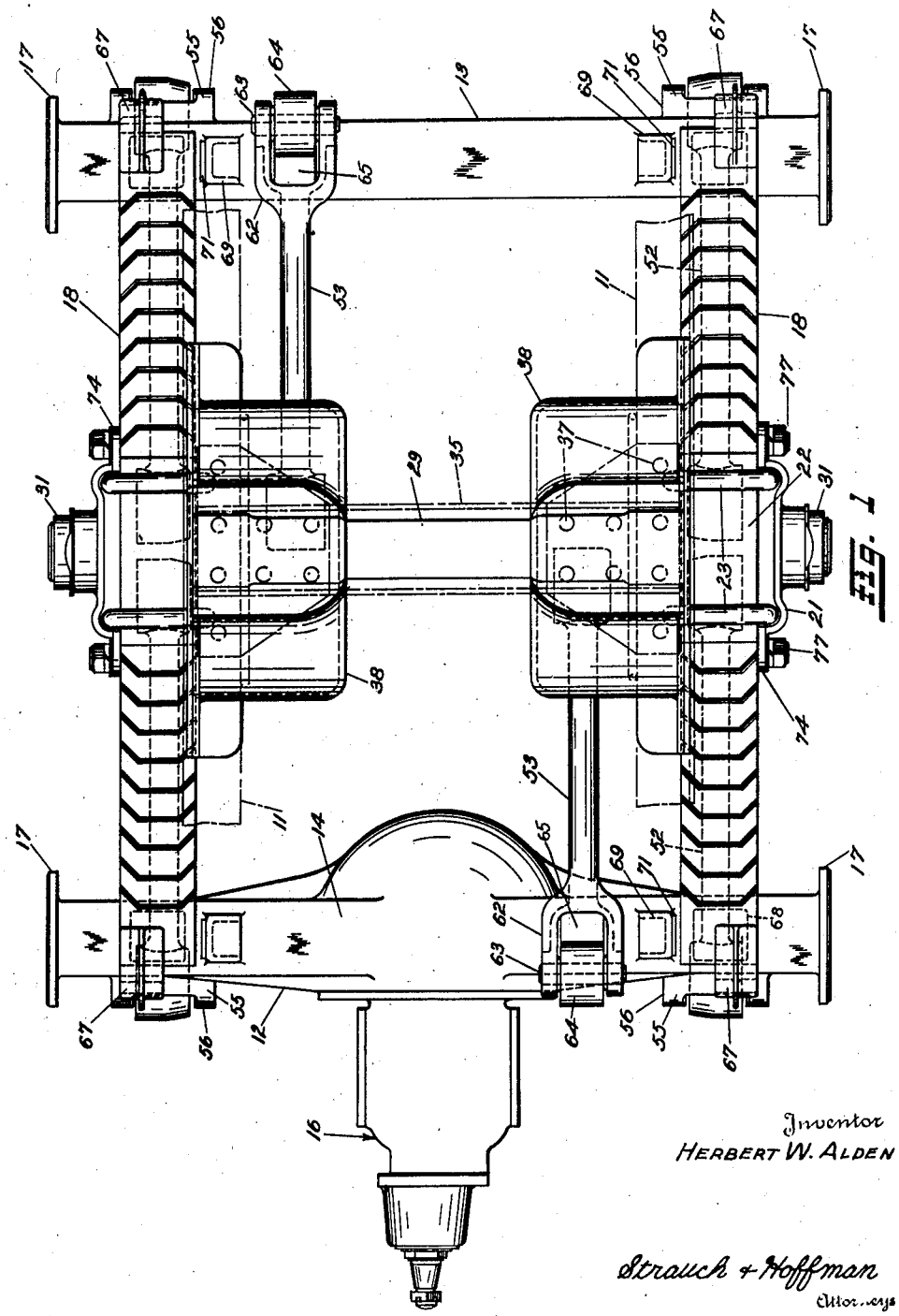

2,078,521

UNITED STATES PATENT OFFICE 2,078,521

SUSPENSION FOR MULTIWHEELERS

Herbert W. Alden, Detroit, Mich., assignor to The Timken-Detroit Axle Company, Detroit, Mich., a corporation of Ohio Application February 15, 1934, Serial No. 711,423

10 Claims. (Cl. 280—124)

This invention relates to improvements in multi-wheel vehicles.

The present invention is especially concerned with improved suspensions for multiple wheel road vehicles of the type embodying load equalizing springs and torque neutralizing devices connected between the vehicle frame and the tandem wheels of the vehicle.

In some of the suspension systems of the prior art embodying a leaf spring and a torque neutralizing device, the construction has been such as to utilize the springs to prevent excessive axial movement of the axles laterally of the vehicle frame. Utilization of the springs for this purpose results in repeated stresses on the spring clips so that the latter may become loosened thereby permitting destructive lateral forces to be directed to the torque rods or other parts of the suspension with frequent resultant failures of the latter.

The construction of the equalizing spring itself in some instances in the prior art has been found to be objectionable since the conventional equalizing spring in its unloaded position convexes upwardly so that in its loaded position it will be substantially horizontal. Hence, when such a spring is mounted with its ends supported above the level of the wheel axes it causes the supported end of the vehicle frame to be of relatively great height and of undesirably high center of gravity. The center of gravity could be lowered by mounting the spring ends in the plane of the wheel axes, but (without undesirably shortening the spring), this would result in a necessarily greater spacing of the sets of tandem wheels relative to each other longitudinally of the frame and moreover, would set up unstabilizing rotational forces on the axles. The center of gravity could also be lowered by utilizing underslung connections between the springs and the axles, but this is not feasible in some installations and in many cases is not desirable. The improved spring of the present invention is designed to be inherently capable of producing the desired results while its ends are supported above the wheel axes.

One of the major objects of the present invention is to provide improved suspensions for multi-wheelers which will properly restrict movement of the tandem wheels laterally of the frame. More specifically, it is an object of the invention to provide a suspension comprising an improved spring seat for the spring to swing accurately in a plane substantially at right angles to the pivotal axis of the spring seat and thereby prevent excessive movement of the tandem axles laterally of the frame.

Another object of the invention is to provide improved suspensions for multi-wheelers comprising a spring construction which is substantially horizontal in its unloaded position so as to permit a lower center of load support for the spring, while simultaneously permitting the spring ends to be desirably supported above the plane of the wheel axes.

Another major object of the invention is to provide suspensions for multi-wheelers comprising an improved arrangement of torque rods designed to cause automatic steering of the tandem wheels.

More specifically it is an important object of the invention to provide multi-wheel suspensions comprising springs and torque neutralizing mechanism which cooperates to produce automatic steering within the limits of flexibility of the suspension, said limits of flexibility being determined by the ends of the respective springs in cooperation with means provided to prevent destructive forces from being imposed upon the torque mechanism.

Further objects of the invention will appear as the description thereof proceeds with reference to the accompanying drawings, wherein:

Figure 1 is a partial top plan view of a tandem axle arrangement comprising one form of the invention.

Figure 2 is a side view in elevation of the multi-wheeler chassis embodied in Figure 1. For clarity of illustration in Figures 1 and 2, the wheels and brake assemblies are removed and an end of the chassis frame is shown in broken lines.

Figure 3 represents a sectional view as seen when looking upon the vertical plane indicated by line 3—3 in Figure 2.

Figure 4 is a greatly enlarged plan view of the spring saddle embodied in Figures 1, 2 and 3.

Figure 5 is an enlarged side elevational view of the spring saddle embodied in Figure 4, and Figure 6 is a side view in elevation showing a modified form of torque arm arrangement designed to cause automatic steering.

With further reference now to the drawings, in which like characters are employed to designate corresponding parts, numeral 11 designates the longitudinal side frame members of a motor vehicle. Beneath the frame is disposed a pair of tandem axles comprising a drive axle assembly 12 and a dead axle 13. Either of these axles may be dead or driven or both of them may be driven. As illustrated, the drive axle assembly comprises a tubular housing portion 14 adapted to receive wheel driving axle shafts driven in usual manner by a propelling mechanism generally denoted at 16. The dead or trailing axle 13 is of tubular formation, its ends being like the drive axle ends. All four ends consisting of the ends of both axles, are adapted for connection to conventional road wheels, and for this purpose each has a flange 17 designed to have a wheel mounting (not shown) secured thereto so that the housings are supported by the wheels.

The axle assemblies are yieldably associated with the vehicle chassis by a pair of leaf springs 18 each one of which is pivoted between its ends on a side of the vehicle frame and has its ends extending between corresponding ends of the axle assemblies and supported thereon in a manner later described. The central pivotal mounting for each spring comprises a spring seat or saddle member 21 upon which the mid-portion of the spring is secured by a plate member 22 and associated clips in the form of a pair of U-bolts 23. The U-bolts fit against the plate member 22 and have their legs extended downwardly, through openings 25 provided in the spring seat 21 to receive locking nuts 26 which are so adjusted with respect to the U-bolts 23 as to firmly clamp the leaves of the spring together while rigidly securing the seat to the underside of the spring.

Each of the spring seats has a depending boss 27 (see also Figures 4 and 5) which is cylindrically bored at 28 transversely of the spring so as to rotatably engage and support one end of a frame-carried cross tube or trunnion shaft 29 that extends transversely of the vehicle intermediate the axle assemblies 12 and 13. The trunnion shaft ends extend beyond the longitudinal side frame members 11. The springs thus are adapted to oscillate about the axis of the trunnion shaft. The ends of the trunnion shaft may be closed in any suitable manner and are provided with adjustment and washer assemblies 31 which abut the outer ends of the depending bosses 27 of the spring seats 21 and hence prevent axial outward movement of the seats along the trunnion shaft. The latter is secured to the frame as follows:

The longitudinal side frames 11 (see especially Figure 3) comprise composite channel members which are disposed with their webs 32 vertical and their flanges 33 and 34 facing inwardly. The side members 11 are connected together by a cross member 35 having reinforced ends as at 36, which is positioned directly above the trunnion shaft 29 and which is secured to the upper flanges 33 of the side members 11 by rivets 37 or the like. The vehicle frame is provided adjacent each side thereof with an angle bracket member 38. Each of the brackets 38 has a flange 39 disposed vertically and riveted as at 41 to the inner face of the web 32 of the adjacent side frame members 11, and has a recessed portion 42 adapted to receive the inwardly facing lower flange 34 of the adjacent side frame members 11, the flange 34 being secured to the flange 43 adjacent the recess 42 as by rivets 44.

Each angle bracket 38 has rigid depending spaced arms 45 and 46 which as shown are integrally connected to a sleeve member 47 which receives the trunnion shaft. Each sleeve 47 is split at the bottom and secured to the trunnion shaft by clamping bolts 48. The spring seats are definitely located between these sleeves 47 and the nut and washer assemblies 31, and hence the springs are confined to oscillation in predetermined vertical planes. Each angle bracket 38 is further provided with depending spaced arms 49 and 51 which extend below the trunnion shaft 29 for a purpose presently described.

A pair of lower torque or radius rods 52 are located below each of the springs 18 and extend longitudinally thereof; and as shown particularly in Figure 1, a single upper torque or radius rod 53 is located adjacent each of the springs 18 being spaced inwardly of the spring. The respective torque rods 53 extend longitudinally of the adjacent springs but are disposed on opposite sides of the trunnion shaft in staggered relation to each other. Each of the lower torque rods 52 is pivotally connected at one end with one of the axles by a stud or spindle 54 rigidly carried by a depending lug 55 which is formed integral or rigidly secured to the said axle. The other end of each of the lower torque rods 52 is pivotally connected to a special spindle or stud 57 rigidly carried by a lug 58 of the depending arm 49 and a lug 59 of the depending arm 51 of one of the angle members 39. The inner ends of each of the upper torque rods 53 is pivotally connected to a spindle 61 rigidly carried by the spaced arms 45 and 46 of one of the bracket members 38. Each upper torque arm 53 is provided at its outer ends with a U-shaped fork portion 62 which is pivotally supported on a pin 63 carried by a lug 64 of an angle bracket member 65 extending rigidly upwardly from one of the axle housings.

The spindles 57 and 61, above described, provide very strong and rigid supports for certain ends of the torque and radius rods, as said spindles are securely fastened each at two points by virtue of the pairs of members 58, 59 and 45, 46, respectively. The actual pivotal point connections, between the ends of the rods and the various spindles and pins, may be of any suitable type such, for example, as illustrated in Buckendale Patent Number 1,946,060, granted February 6, 1934, wherein rubber is embodied in the joints to permit a limited amount of flexibility and universality while simultaneously cushioning shocks. Suffice it to say here that, except for the specific frame mountings for the pivotal connections, the general type of rod arrangement is old and functions in the usual manner to locate the axles longitudinally of the vehicle and to prevent rotation of the axles about their axes, while simultaneously permitting the suspension to have a proper degree of flexibility when the tandem wheels pass over road irregularities.

Each of the springs 18 has its opposite ends inserted in recesses 66 provided therefor above the axles by bracket members 67 adjacent the ends of the respective axles. These brackets may be cast integrally with the axle housings or as shown may be connected to the housings as by welding or the like. The ends of the springs rest on buttons 68 which are positioned interiorly of the recesses 66 and are welded to the upper surface of the housings. The spring supporting surface of each button 68 is shaped or curved convexly so as to permit the end of the spring to rock as well as slide thereon when the spring is deflected.

Abutments 69 are formed on or secured to the axle housings adjacent the inner sides of the ends of the springs. Each of the side abutments 69 has a thin plate member 71 secured thereto as by riveting. The plate members are of approximately the same height as the spring ends and are spaced therefrom slightly,—e. g. about ¼ inch.

The brackets 67 are open on both sides as well as in the front thereof and thus while loosely confining the spring ends therein, permit free relative movement of the spring and axle housing in various horizontal directions. It will be noted, however, that the plate members 71 allow only a limited inward lateral movement of the spring ends. This limited movement is desirable to permit a slight automatic steering or tracking action of the tandem wheels and thus avoid drag when rounding curves. Furthermore, it and the slight vertical freedom of the spring ends are necessary to permit one end of an axle to tilt vertically with respect to the other without twisting the springs.

As a result of the above described arrangement, any endwise axial movement of the axles will be resisted or checked when the spring ends come into lateral contact with the side plates 71. Up to the time of this contact, the only resistance to the axial movement is in the torque rods, and thereafter the further tendency for lateral axial movement is absorbed by both the rods and the springs. The rods and their connections will not withstand, without failure, the stresses that may be set up by too great an axial lateral movement of the axles, and accordingly the springs must be properly designed and must swing accurately in defined vertical planes so that they will always come into action and perform their function at the right time. In prior constructions of the general type here disclosed, there has been a tendency for the spring clips, due to their close proximity to the spring centers and to loading on the ends of the springs to become loosened and thus permit excessive lateral axial movement of the axles, with resultant torque rod failures. The present invention contemplates insurance of proper spring functioning at all times in the following manner:

As shown best in Figures 4 and 5, the spring seat 21 embodied in Figure 1 has in addition to a seating surface 72, a pair of longitudinally extending end slots 73, and has on each side upwardly projecting lugs 74 adapted to yieldably engage the sides of the bottom leaves of the spring. Each lug 74 has a depending cylindrical boss 75 which is provided with an opening 76 adapted to receive a suitable clamping bolt assembly 77 (see Figure 1) which extends transversely of and beneath the slotted seat portion. When the bolt assemblies are tightened the slots 73 permit the upwardly projecting lugs 74 to be firmly clamped against the spring to thus assist the spring clips in positively confining the spring to swinging movement in a vertical plane that is precisely perpendicular to the axis of the trunnion shaft 29.

It should be noted that, although the spring ends rest upon the axles, the mid-portions of the springs are no higher than the plane of the axle tops, and the axis of spring oscillation is disposed in or closely adjacent the horizontal plane which contains the wheel axes. These relationships result from the use of springs which are substantially straight in unloaded condition and which bow slightly downwardly at their midportions when under load, as illustrated in Figure 2. The advantages of this arrangement are that, while desirably supporting the load through the spring ends at such points as not to subject the torque rods to excessive tensional and compressive stresses, and while utilizing single springs of sufficient length to afford proper resilience without increasing the axle spacing—, the lowered central portions of the springs permit the vehicle framework to be brought close to the ground with low center of gravity, and further permit the suspension points of load application (in the axes of the trunnion) to be brought approximately into the plane of the wheel axes to afford maximum all-around stability.

The operation should be clear from the foregoing description and exposition. The major features may be summarized as follows:

Résumé

The side abutments associated laterally with the ends of the springs are adapted to engage the spring ends after a predetermined laterally inward movement and thus resist further inward lateral movement. The loose connections between the ends of the springs and the axle housings permit the ends of the springs to rock as well, slide freely on the axle housings in response to deflection of the springs incident to load and shock distribution so that automatic steering of the tandem wheels is permitted within the limits of flexibility of the torque rods, after which the springs cooperate with the recessed brackets in which they operate to prevent excessive forces from being directed laterally of the torque rods.

The improved seat for the equalizing springs having lugs which yieldably engage the side of the springs and having means associated therewith for bringing the lugs into clamping engagement with the sides of the springs causes the springs to swing accurately in a plane at right angles to the cross tube or trunnion shaft and thus prevent excessive lateral or endwise movement of the vehicle axles with the result that there is small possibility of failure in the spring clip and consequent direction of destructive lateral forces to the torque arms with resulting failure.

The torque rods serve to maintain the two axles parallel and in proper spaced relation and also serve to neutralize the torque stresses set up in the axle housings during operation. The arrangement of the torque rods is such as to permit independent vertical movement of the axle housing and since the ends of the springs slide freely with respect to the axles, the axle ends may approach and recede as the corresponding sides of the vehicle frame are elevated and depressed incident to irregularities in the road surface to thus facilitate automatic steering of the tandem wheels or proper tracking thereof.

The equalizing springs are of such construction as to be approximately horizontal both in loaded and in unloaded position, thus permitting an unusually low center of gravity in an arrangement where the spring ends are supported on the tops of the axles.

Modification

In the modified construction of Figure 6, there is shown a parallelogram arrangement of torque rods associated with one side of the vehicle frame, comprising a pair of lower torque rods 78 and a pair of upper torque rods 79 wherein the torque rods are all inclined downwardly from the center of the spring toward the spring ends. It will be understood that a similar parallelogram arrangement of inclined torque arms is associated with the other side of the vehicle frame and that the construction otherwise is similar to that described in connection with Figures 1–5. The operation differs therefrom, however, as follows:

There is a material inclination of the torque rods in unloaded condition and even an appreciable inclination under load, as shown in Figure 6, and hence as the ends of the springs slide freely with respect to the axles when the latter swing about the trunnion axis, the axle ends may approach and recede from each other as the corresponding sides of the frame are elevated and depressed relative to the road surface. Therefore, if one side of the frame should rise there would be a tendency for the torque rods at that side to increase their inclination to the horizontal and thus draw the axle ends closer together; and vice versa, should the frame approach the ground there would be a tendency for the rods at that side to become horizontal and thus spread the corresponding axle ends farther apart. Advantage is taken of this arrangement and its effect upon the axles, to produce a limited automatic steering of the tandem axles and wheels. That is, when the vehicle rounds a curve in the road there will be sufficient side-sway or lateral load distribution to cause the frame to approach the ground slightly on the outside of the curve, thus causing an increased wheel spacing at that side; and simultaneously the opposite side of the frame will rise slightly to decrease the wheel spacing.

The same general steering result has been heretofore suggested, but prior proposals have contemplated the use of the springs as part of the automatic steering mechanism. The present arrangement is an improvement in that it involves only members of invariable length which produce more definite and desirable tracking of the tandem wheels than can be obtained with a resilient spring. Moreover, the disclosed embodiment permits the spring ends to be free relative to the axles, whereas prior suggestions have been limited solely to suspensions of the type where the spring ends are immovably connected to the axle ends.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a multi-wheel vehicle having a frame, a pair of tandem axles disposed at one end of said frame, and a suspension at each side of said frame for supporting the latter upon said axles; each suspension comprising a flexible member extending longitudinally of said frame; and means for connecting said flexible member intermediate its ends to said frame; said means comprising a seat for said flexible member having adjustable means for engaging the sides of said flexible member; and means for bringing said adjustable means into rigid clamping engagement with the sides of said flexible member.

2. In the construction as defined in claim 1, said seat comprising a spring receiving portion, a longitudinally extending slot adjacent each end thereof, upwardly projecting lugs at each side of said slot and means for causing said lugs to clamp the said flexible member rigidly therebetween.

3. In a multi-wheel vehicle of the type having a framework mounted on sets of tandem wheels through a spring suspension embodying leaf springs which have their midportions carried on mountings adjacent the sides of the framework and which have ends designed to check axial wheel movement laterally of the framework, means associated with said mountings and said leaf springs to positively ensure maintenance of the midportions of the longitudinal center lines of said springs within predetermined vertical planes extending longitudinally of the vehicle, said means comprising devices carried by the frame and adjustable laterally of the springs, and means for adjusting said devices.

4. In a vehicle having a framework supported on wheels at one end by suspensions comprising longitudinally arranged leaf springs secured to the framework by seat and mounting assemblies and to the wheels through connections designed to limit axial shifting movement of the latter, means incorporated in said seat and mounting assemblies to add lateral support to the leaf springs, said means comprising members designed to be drawn directly into lateral engagement with said springs, and means for positively drawing said members into said lateral engagement.

5. In a multi-wheel vehicle having a framework with sets of tandem wheels disposed adjacent one end thereof, means secured to the framework to provide a pivotal axis transversely of the framework between the sets of wheels and approximately within the horizontal plane of the latter, and leaf springs disposed longitudinally of and adjacent the sides of said framework, said springs being peculiarly designed so that their midportions are straight and swingingly mounted on and immediately adjacent said transverse pivotal axis and so that their ends are curved upwardly in concave form for support by said wheels at points substantially above the axes of said wheels.

6. In a multi-wheel vehicle of the type comprising longitudinal horizontally channeled frame members supported on tandem sets of wheels through suspensions embodying elongated elements which have pivotal connections with the frame members, mounting means for affording said pivotal connections, said mounting means comprising brackets having integral portions fitted within said channeled frame members and in surface engagement with the vertical sides of the latter and further integral portions fitted against horizontal flange portions of the frame members, said first and second named portions cooperating to provide recesses for reception of said horizontal flange portions, and means for securing said first and second named bracket portions rigidly to the vertical side and flange portions respectively of the frame members, and said brackets further having integral depending portions designed to carry the said pivotal connections in partially underlying relation to said frame members.

7. In a multi-wheel vehicle having a framework with a pair of wheel-supported axles disposed in closely spaced tandem relationship thereberneath, a pair of depending brackets secured at opposite sides of the framework, and a suspension system at each side of said framework to resiliently mount the latter upon said axles; each suspension system comprising a leaf spring of special curvature connected adjacent its center to one of the brackets and having the bottom of its center portion substantially in the plane of the axes of the axles and held against lateral displacement relative to the frame, the spring ends being inclined upwardly and thence curved downwardly and slidably supported atop the corresponding axle ends in a manner to permit said axle ends to recede from and approach each other and to assume non-parallel positions with respect to each other, means associated with the spring ends to prevent excessive endwise axle movement, and two parallelogram arrangements of radius and torque rods comprising elements connected at their inner ends to one of said brackets at points above and below the top and bottom planes of the spring, and at their outer ends to the axle at points below the latter and at points above the spring ends.

8. In the combination defined in claim 7, each of said springs designed to have the center line of its mid-portion substantially in a straight line with its ends when under load, and said rod connections being flexible and all of the rods inclined downwardly toward the brackets under load when the vehicle is traveling a straight course.

9. In a multi-wheel vehicle having a framework with closely spaced tandem axles disposed adjacent a portion thereof, means secured to the framework to provide a pivotal axis transversely thereof between the ends of the axles, leaf springs arranged longitudinally of and adjacent the sides of the framework with their midportions adjacent said pivotal axis, mounting means secured to the springs and swingingly related to said pivotal axis, said pivotal axis and mounting means being so related and designed that the midportions of the springs are at least partially contained between the top and bottom planes of the axles, and said springs being designed to curve away from their midportions toward one of said planes and thence to curve oppositely at their end extremities for support by the ends of said axles.

10. In the combination defined in claim 9, said axle ends being provided with devices forming bearing surfaces shaped to receive said curved spring end extremities.

HERBERT W. ALDEN.